United States Patent [19]
Jordan

[11] Patent Number: 5,183,309
[45] Date of Patent: Feb. 2, 1993

[54] RIGID LOW PROFILE PICKUP TONNEAU

[76] Inventor: Gregory E. Jordan, 915 N. Main, Belton, Tex. 76513

[21] Appl. No.: 764,809

[22] Filed: Sep. 24, 1991

[51] Int. Cl.⁵ .............................................. B60P 7/02
[52] U.S. Cl. ................................. 296/100; 220/200
[58] Field of Search ......................... 296/100; 220/200

[56] References Cited

U.S. PATENT DOCUMENTS

| | | | |
|---|---|---|---|
| 3,514,152 | 5/1970 | Hermon | 296/100 |
| 3,768,858 | 10/1973 | Boismier | 296/100 |
| 4,832,359 | 5/1989 | Rafi-Zadeh | 296/100 |
| 4,844,531 | 7/1989 | Kooiker | 296/100 |
| 4,946,217 | 8/1990 | Steffens et al. | 296/100 |

Primary Examiner—Robert R. Song

[57] ABSTRACT

A cover assembly for the rear compartment of a pickup truck consisting of three rectangular panels arranged longitudinally along the top of the compartment. The center panel is substantially fixed and the side panels are pivotally attached along their inside edges to the outside edges of the center panel and are moveable from a closed to an open position. A flange extends beyond the perimeter of the cover and overlaps the top surfaces of the truck bed providing support for the cover. A horizontal member is attached to the rear edge of the center panel and in combination with a vertical member at each end provides support for the rear of the cover when the tailgate is open.

8 Claims, 3 Drawing Sheets

RIGID LOW PROFILE PICKUP TONNEAU

BACKGROUND—FIELD OF INVENTION

This invention generally relates to a load carrying vehicle such as a pickup truck or any other vehicle having an open load carrying rear compartment described by two parallel upstanding side walls, an upstanding front wall, and a pivotally mounted rear wall which may be disposed in a substantially upstanding vertical position or a horizontal position. This invention specifically relates to a cover assembly for the rear compartment of such vehicles.

BACKGROUND—DESCRIPTION OF PRIOR ART

Providing a cover assembly for the rear compartment, commonly known as the bed, of a pick-up truck has many advantages. The most obvious is the ability to protect carried loads from inclement weather. A cover also secures light weight loads against blowing out of the bed at high speeds. Where a rigid cover assembly is provided it may allow for the bed and contents thereof to be secured by a locking device incorporated in to said rigid cover. A rigid cover also provides a load bearing surface above the bed. Additionally, by providing a smooth top surface for the bed, a cover reduces aerodynamic drag, therefore increasing the fuel efficiency of the vehicle.

Heretofore, there have been two basic approaches to such cover assemblies. Each approach has specific disadvantages which this invention will overcome.

The first approach is composed of a flexible waterproof cover sheet which is stretched across the top of the bed, thereby providing protection from inclement weather. The nature of the flexible cover sheet does not by itself provide sufficient resistance to sagging to prevent the pooling of moisture when the vehicle is not in motion. Nor does it allow the attachment of a locking device. Therefore a carried load cannot be secured against theft.

This type of cover sheet is attached along the top perimeter of the bed by various means. One such means of attachment involves drilling or punching holes into the top rail of the bed, into which are secured a multitude of fastening devices, such as snaps. These engage corresponding snaps along the perimeter of the cover sheet. A second means of attachment involves the use of a hook-and-loop fastener whereby either the hook or the loop component is fixed with an adhesive bond along the top perimeter of the bed. This engages the complimentary section attached to the perimeter of the cover sheet.

When the snap type fasteners are used the holes required to mount them expose raw metal edges. The edges are subject to corrosion which leads to a deterioration of the finish of the bed and ultimately to the structure of the bed itself.

If it is desired that the bed be returned to its original condition these fastening devices pose a distinct problem. When snap-type fasteners are removed, costly repairs are required to fill the holes and restore the original finish. When hook-and-loop fasteners are removed, some or all of the adhesive remains on the truck bed. This generally must be removed with a solvent which could also damage the bed finish. Any damage to the bed if not repaired results in a devaluation of the vehicle.

The second approach to cover assembly design is composed of one or more moveable rigid cover panels comprised of a framed or molded shape which provides a load bearing surface above the top of the truck bed. While this design does allow for a lockable assembly, in its present forms there are specific disadvantages.

In one form the entire panel or panels is disposed above and rests on the top perimeter of the bed. This adds height to the overall appearance of the bed which impinges on the original aesthetic appearance fo the vehicle.

In another form the panel(s) is fitted within the bed, with the top surface of the panel(s) being flush with the top surface of the bed rails. While this is more aesthetically appealing than the aforementioned above-the-rail configuration, it does not provide substantial weather resistance. This results from the need for clearance between the panel(s) and the bed rails to allow satisfactory operation of the moveable panel(s).

When a single panel is provided, it is generally attached by a pivotal means to the top of the front upstanding wall of the truck bed. The rear edge is lifted vertically to raise the cover and provide access to the bed. While the rear of the bed is easily accessible, necessary accessibility at the front is greatly restricted because of the attachment there of the cover panel.

This disadvantage is overcome by the multi-panel cover assembly to which this invention directly relates. The accessibility to the entire length of the bed provided by a side opening cover is a definite advantage.

Various types of multi-panel side opening cover assemblies have been proposed, i.e. U.S. Pat. Nos. 3,420,570 to Kunz (1969); 3,514,152 to Hermon (1970); and 3,866,972 to Reese (1975). While these patents describe side opening devices, they also have inherent disadvantages. They are all disposed above the bed causing a high profile cover assembly as earlier discussed. These cover assemblies, like the single panel covers, require that they be attached directly to the truck bed. The components requiring attachment generally include, but are not limited to, hinges, brackets, locking hardware, and supports for open panels. The direct attachment to the bed of these components by fastening devices, such as screws or rivets, require drilled or punched holes. The disadvantages of such holes are as discussed earlier.

In addition, the direct attachment of these components requires special skills. Thus initial installation is complicated and, in some cases, may necessitate additional cost. Temporary removal and subsequent reinstallation is also complicated because fastening devices must be removed.

As described previously, known cover assemblies have these disadvantages:

(a) Sheet-type covers do not provide a load bearing surface above the truck bed.

(b) Sheet-type covers do not allow for the installation of locks.

(c) Above-the-rail rigid covers have a high profile.

(d) Inside-the-rail rigid covers do not provide sufficient weather resistance.

(e) One-piece rigid covers do not provide sufficient access to the entire length of the bed.

(f) Known covers, whether sheet-type or rigid, single or multi-panel, require direct attachment of mounting brackets, hinges, locking devices, and/or support devices to the vehicle bed.

(g) Direct attachment requires special skill for initial installation and complicates subsequent temporary removal and reinstallation.

(h) Permanent removal of all the discussed covers results in defacing the vehicle bed which requires costly repair work to restore the vehicle bed to its original condition.

OBJECTS AND ADVANTAGES

Accordingly, it is the purpose of this invention to overcome these disadvantages by providing a cover assembly;

(a) With a rigid, load bearing surface above the vehicle bed;

(b) With a locking assembly which allows the vehicle bed to be secured;

(c) Having an aesthetically pleasing low profile;

(d) Sufficiently weather resistant to protect carried loads;

(e) Which allows access to the entire length of the bed;

(f) Which allows installation independent of direct attachment of mounting hardware, hinges, or support devices to the vehicle bed;

(g) Which permits initial installation as well as subsequent temporary removal and reinstallation, to be accomplished rapidly and easily without special skills;

(h) Which may be permanently removed without leaving the vehicle bed defaced or altered from its original condition.

The foregoing and other objects, features, and advantages of the invention will be apparent from the following, more detailed description of a preferred embodiment of the invention, as illustrated in the accompanying drawings.

DRAWING FIGURES

DESCRIPTION OF THE PREFERRED EMBODIMENT FIGS. 1–8

Figure 1:
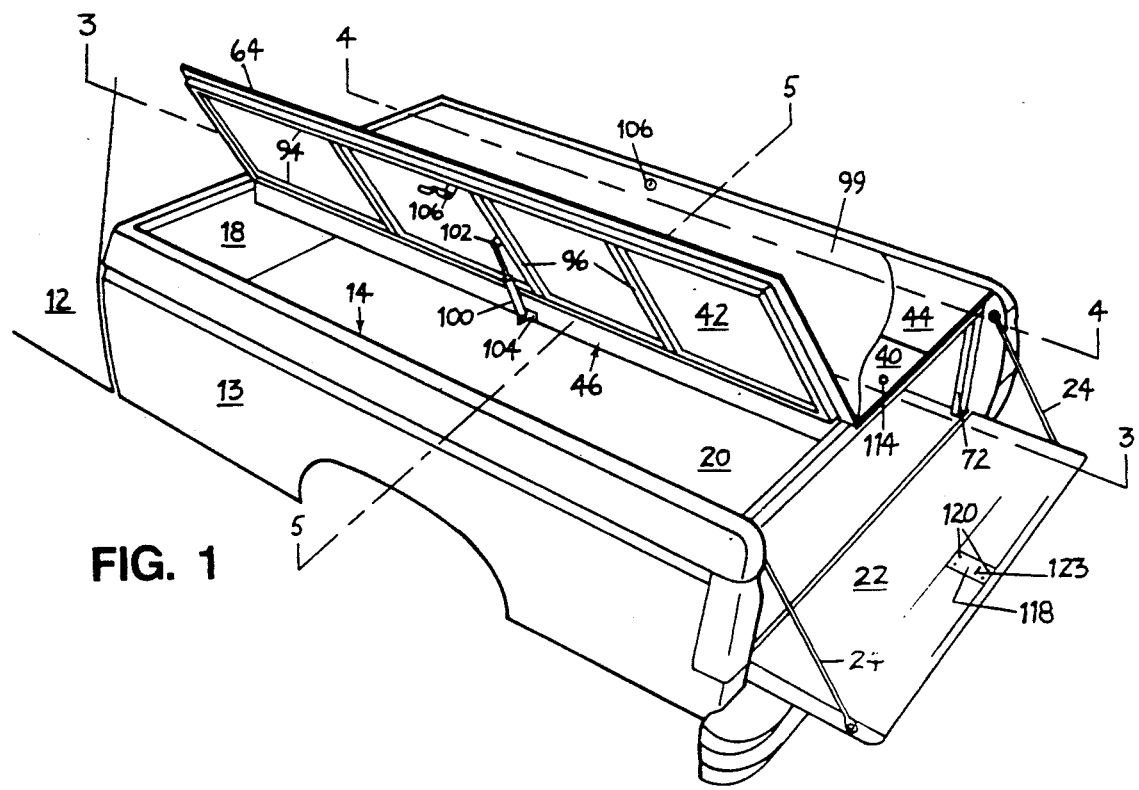
FIG. 1 is a perspective view of a pickup truck having a load carrying compartment, or bed, with the present invention provided thereon. The left side panel and the tailgate are shown in their open positions.
Figure 2:
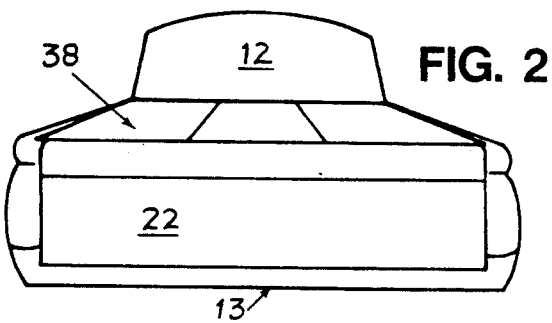
FIG. 2 is a rear perspective view of a truck showing the cover assembly and tailgate in their closed position.

Referring to the drawings, there is illustrated in FIGS. 1 and 2 a conventional pickup truck, including a cab assembly 12 and a truck bed assembly 13. The truck bed 13 is described by two vertical sidewalls 14 and 16, a vertical front panel 18, a horizontal floor 20, and a pivotally attached tailgate 22. The tailgate 22 can be disposed in a vertical upstanding position as in FIG. 2 or an open horizontal position as in FIG. 1. It is supported in the horizontal position by supports 24 attached at one end to the tailgate 22 and at the other end to the bed sidewalls 14 and 16. The sidewalls 14 and 16 include horizontal top rails, 26 and 28, and vertical lips 30 and 32 seen clearly in FIG. 5. The front panel 18 includes a top rail 34 and a lip 36 as seen in FIGS. 3 and 4.

Figure 5:
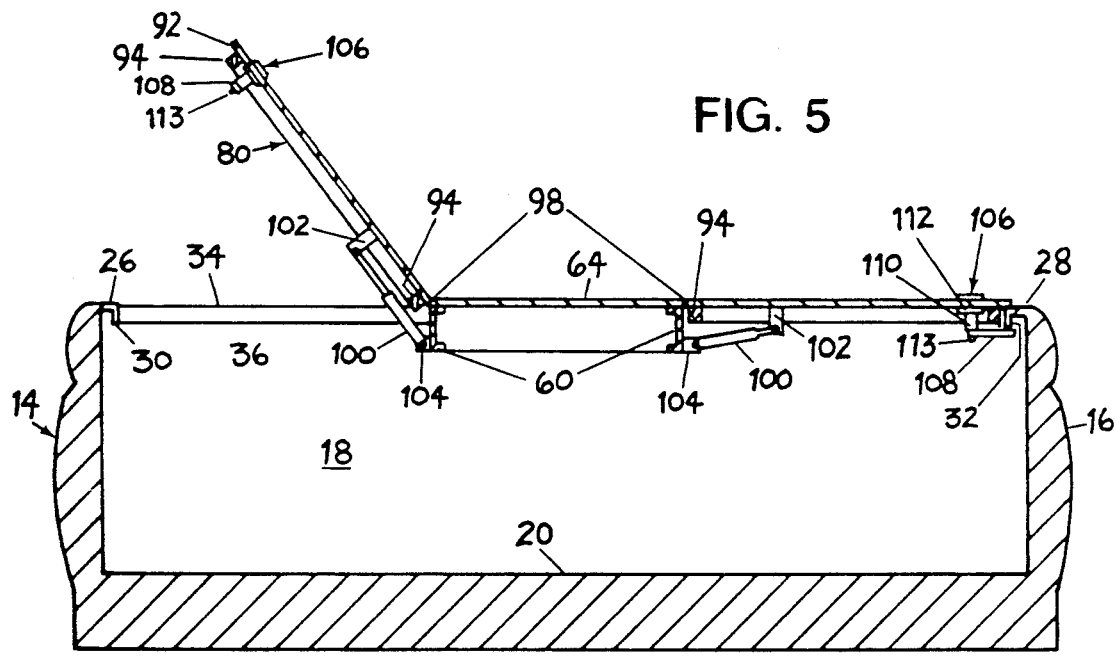
FIG. 5 is a lateral cross section taken along line 5—5 of FIG. 1 showing side panel, center panel, panel lock, and side panel support mechanism detail.

FIGS. 1 and 2 show the truck bed 13 with the cover assembly 38 installed. According to the present invention the cover assembly 38 includes a center panel 40 and left 42 and right 44 side panels arranged in a longitudinal configuration transversely disposed along the top of the bed 13. According to the invention as is seen in FIGS. 3 and 5, the center panel 40 is composed of a rigid panel body 46, a front flange 56, and a rear flange 58. In the preferred embodiment, the center panel body 46 is a framework of lightweight material such as wood or aluminum, defined by two outside longitudinal members 60, and a plurality of lateral members 62, and a rigid deck 64. The front 56 and rear 58 flanges are formed by extending the rigid deck 64 beyond the front and rear edges of the center panel body 46. The front flange 56 overlaps and rests on the top rail 34 of the front panel 18.

Figure 3:
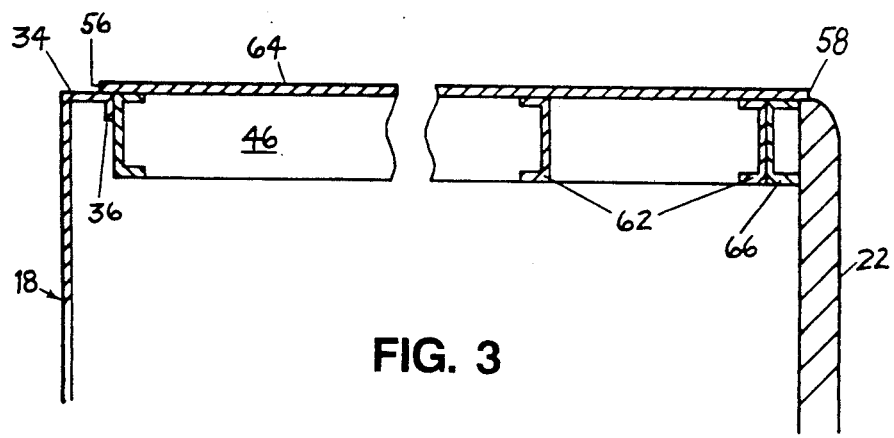
FIG. 3 is a cross section taken along line 3—3 of FIG. 1 with the tailgate in its closed upright position showing center panel structure.
Figure 4:
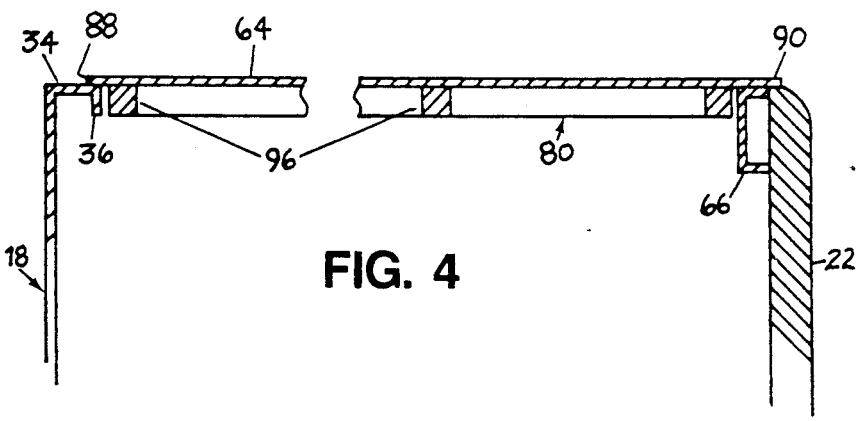
FIG. 4 is a cross-section taken along line 4—4 of FIG. 1 showing side panel structure.
Figure 6:
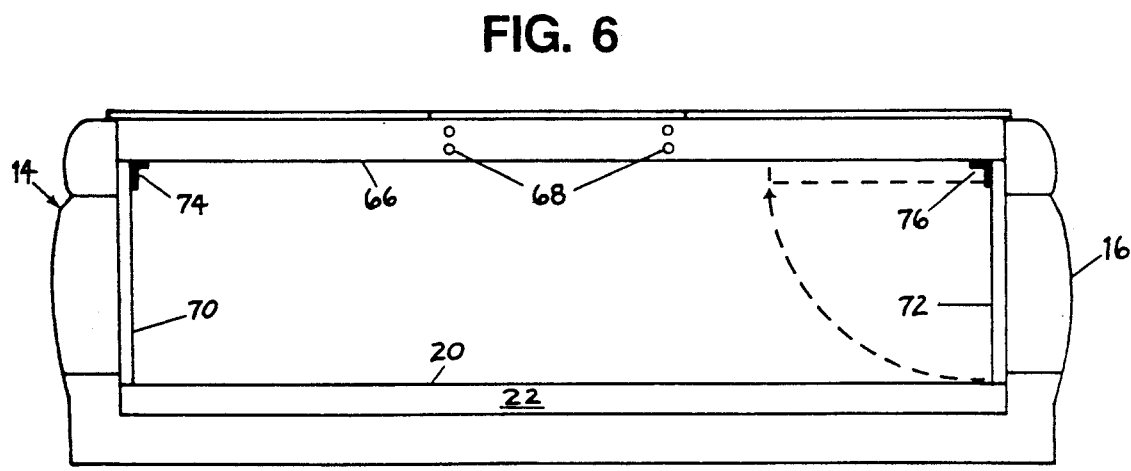
FIG. 6 is a rear elevation of the truck bed with the tailgate open showing the horizontal support member and vertical supports.

As illustrated in FIGS. 1, 3 and 6, a lateral horizontal support member 66 is rigidly affixed to the rear edge of the center panel body 46 by fastening devices 68 such as screws or threaded bolts and nuts. At each end of the horizontal support 66, vertical supports 70 and 72 are attached with hinges 74 and 76 at their upper ends. The lower ends of the vertical supports 70 and 72 rest on the bed floor 20 as seen in FIG. 6. The rear flange 58 extends beyond the rear edge of the center panel body 46 a sufficient distance as to overlay the horizontal support 66 and the top inside edge of the tailgate 22, FIG. 3.

Since the substance and operation of the left 42 and the right 44 side panels are identical, for the purpose of description all components will be understood to relate to either or both side panels. As seen in FIGS. 1, 4 and 5, each side panel 42, 44 is composed of a rigid panel body 80, a front flange 88, a rear flange 90, and an outside flange 92. In the preferred embodiment, the side panel body 80 is a framework of such lightweight material as aluminum or wood, defined by two longitudinal members 94, a plurality of lateral members 96 and the rigid deck 64. The front 88, rear 90, and outside 92 flanges are formed by extending the rigid deck 64 beyond the corresponding edges of the side panel body 80. The front flange 88 and outside flange 92 overlap the corresponding front 34 and side 26, 28 rails of the bed 13. The rear flange 90 extends beyond the side panel body 80 a sufficient distance as to allow the flange to overlay the horizontal support 66 and the top inside edge of the tailgate 22. The side panels 42 and 44 are attached along their inside edges to the outside edges of the center panel 40 by a longitudinally extending continuous hinge 98 to provide a moveable configuration.

In the preferred embodiment the top surfaces of the center panel 40 and the side panels 42, 44 are in a flush relationship. This allows for a smooth flat top surface of the cover assembly 38 when the side panels 42,44 are in a closed position. The entire top surface is covered with a one-piece vinyl-coated fabric sheet 99. This sheet 99 is attached directly to the rigid deck 64 with an adhesive material. The edges of the sheet 99 wrap around the flanges 56, 58, 88, 90, 92 of the cover assembly 38 and are secured to the bottom surface of the flanges 56, 58, 88, 90, 92 by the use of an adhesive material.

Collapsible support mechanisms 100 are provided to hold the side panels 42, 44 in a upright position as in FIGS. 1 and 5. One end of each support 100 is secured by a bracket 102 attached to the underside of the side panel body 80. The opposing end is secured by a similar bracket 104 attached adjacent to the lower outside edge of the longitudinal member 60 of the center panel body 46. The brackets 102 and 104 are positioned as to allow correct operation of the support mechanisms 100.

As seen in FIGS. 1 and 5 locking assemblies 106 are provided to secure the side panels 42 and 44 in a closed position. Each lock assembly 106 includes a threaded lock body 110 containing a key operated cylinder, a complimentary threaded nut 112 and a rotating locking arm 108. The locking assembly 106 is positioned in a close proximity to the outside edges of the side panel 42 or 44 through a hole provided in the rigid deck 64. Mounting of the locking assembly 106 is accomplished by inserting the lock body 110 into the provided hole threading and tightening the nut 112 against the underside of the deck 64. The rotating arm 108 is then attached to the lower end of the lock body 110 with a screw 113.

Figure 7:
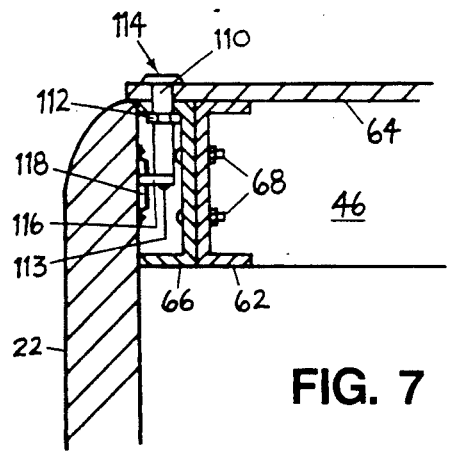
FIG. 7 is a section view showing tailgate lock detail.

FIGS. 3 and 7 show detail of the tailgate lock assembly 114. This assembly is mounted in substantially the lateral center of the center panel 40 and longitudinal alignment with the center of the horizontal support member 66. The components and the mounting of this lock assembly 114 are identical to the side panel lock assembly 106 with the exception of a notched locking arm 116. This notch is provided to engage a corresponding slot 123 in a locking plate 118. This plate 118 is attached to the inside surface of the tailgate 22 utilizing factory-installed access panel fasteners 120.

OPERATION OF THE PREFERRED EMBODIMENT

With reference to the drawings and description, the cover assembly 38 is directly supported by the truck bed 13. As seen in FIG. 3, the center panel 40 is supported along its front edge by the front flange 56 which rests on and is supported by the front panel rail 34. The rear edge of the center panel 40 is supported by the horizontal support member 66 rigidly attached thereto. In turn, the horizontal support 66 is supported at each end by the vertical supports 70, and 72. The lower ends of the vertical supports 70, 72 rest on and are supported by the truck bed floor 20. The hinges 74, 76 at the upper ends of the vertical supports 70, 72 allow these supports to fold to a parallel relationship with the horizontal support 66 when the cover assembly 38 is not installed on the truck bed 13, FIG. 6.

As illustrated in FIGS. 1 and 5, each side panel 42 and 44 is supported at its inside edge by the continuous hinge 98 attached to the center panel 40. In the closed position the outside flange 92 overlaps the side wall rail 26, 28 providing support for the closed panel. The outside edge of the side panel 42, 44 is raised vertically to move the panel to its open position. The panel is held in this open position by a collapsible support mechanism 100. This support 100 extends when the panel 42, 44 is opened and collapses when the panel 42, 44 is closed.

Providing flanges 56, 58, 88, 90, 92 along the perimeter of the cover assembly 38 allows for support of the cover assembly 38 and also provides a water-resistant configuration. Additionally since the flanges 56, 58, 88, 90, 92 are formed by extending the rigid deck 64 beyond the edges of the panel bodies 48 and 80, only the thickness of the deck 64 is disposed above the top of the truck bed 13 thus resulting in a low-profile cover assembly.

Locking the side panels 42, 44 is accomplished by inserting a key into the upper end of the lock body 110. When the key is turned the rotating arm 108 engages the underside of the side wall lip 30, 32 thereby preventing the raising of the side panel 42, 44 FIG. 5.

Figure 8:
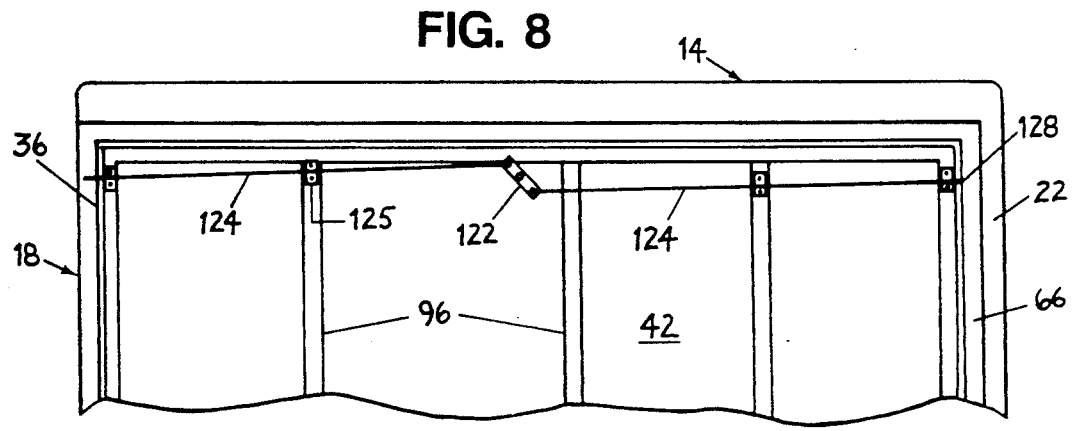
FIG. 8 is an underside view of a side panel in the closed position showing an alternate locking method.

FIG. 8 illustrates an alternative locking method for use when no side wall lip 30, 32 is present. This method utilizes longitudinal locking rods 124 attached to a double-ended rotating arm 122. The lock rods 124 are supported by brackets 125 attached to the underside of the side panel body 80. The double-ended arm 122 is mounted in the same manner as the rotating arm 108 in the original locking method. To lock the panel 42, 44 the key is inserted into the lock body 110 and turned thus rotating the double-ended arm 122 and in turn pushing the lock rods 124 in opposing directions. The forward end of the forward rod slides under and engages the underside of the front panel lip 36. The rearward end of the rearward rod slides under and engages a hole 128 provided in the horizontal support member 66, therefore the front and rear edges of the side panel 42 are secured in the closed position.

FIGS. 3 and 7 illustrate the tailgate lock assembly 114. Operation of this assembly is essentially the same as the side panel lock with the exception of the notched rotating arm 116. When the lock is turned the notch engages a slot 123 provided in the locking plate 118, thus securing the tailgate to the cover assembly 38 in an upright position.

Figure 10:
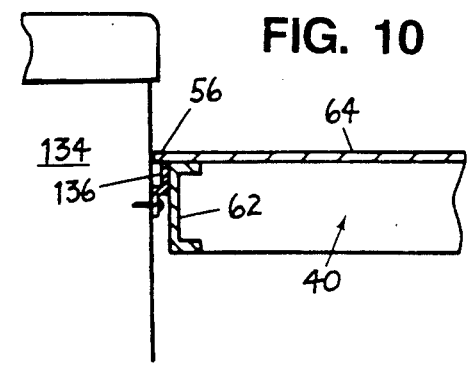
FIG. 10 is a partial longitudinal cross section showing a mounting method if a lateral box is present at the front of the bed.

This invention can also be employed in conjunction with a laterally affixed box 134, commonly called a cross-bed tool box, at the front of the bed. FIG. 10 shows this configuration wherein the front flanges 56, 88, instead of overlapping the front panel rail 34 overlays a continuous support rail 136 attached to the rear of the box 134.

SUMMARY, RAMIFICATIONS, AND SCOPE

As can be seen from the foregoing, this invention provides a cover assembly for the bed of a pick-up truck or the like, which provides a load bearing surface above the bed, which allows for a lockable assembly, which has an aesthetically pleasing low profile, which provides sufficient weather resistance to protect carried loads, and which allows access to the entire length of the truck bed. The use of a flange along the perimeter of the cover assembly and the horizontal and vertical supports at the rear allow this invention additional advantages in that:

initial installation is independent of direct attachment of mounting hardware, hinges, or support devices to the truck bed.

initial installation as well as subsequent temporary removal and reinstallation is accomplished rapidly and easily without special skills or tools permanent removal does not deface or alter the truck bed from its original condition.

Figure 9:
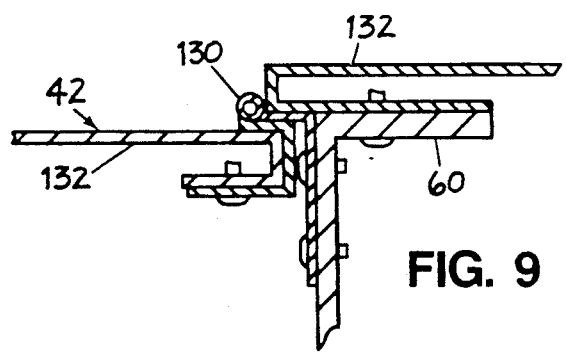
FIG. 9 is a partial lateral cross section showing an alternate panel hinge method.

Although the above description contains many specifications, these should not be construed as limiting the scope of the invention, but as merely providing illustrations of some of the presently preferred embodiments of this invention. For example, FIG. 9 illustrates an embodiment wherein a rigid sheet material 132 is used instead of the deck 64 and the panels 40 and 42 are offset to provide a water resistant configuration which eliminates the need for the fabric sheet 99. Other changes such as materials, or methods of construction, should be understood as not to limit the scope of this invention.

Thus, the scope of this invention should be determined by the appended claims and their legal equivalents, rather than by the examples given.

I claim:

1. A cover apparatus for a rear compartment of a pickup truck or the like, said rear compartment comprising an upstanding front wall, two upstanding sidewalls, a pivotally mounted rear wall, each having a top surface, and a horizontal floor; said cover including; a rectangular center panel and two rectangular side panels longitudinally arranged along the top of said rear compartment, said center panel being substantially fixed and said side panels being pivotally attached by their inside edges to the outside edges of said center panel and being movable from a closed position to an open position to provide access to said rear compartment, a laterally extending horizontal support member, a support means at each end of said member for supporting said center panel on said bed, and a flange extending from the edges of said cover along its perimeter, said flange overlapping said top surfaces of said front wall, side walls, and rear wall.

2. The cover of claim 1 wherein said center panel and said side panels are comprised of a rigid panel body and said flange.

3. The cover of claim 1 wherein said flange extends from said perimeter along the plane of the top surface of said panels.

4. The cover of claim 1 wherein said horizontal support member is rigidly attached to the rearmost portion of said center panel.

5. The cover of claim 1 wherein said support means is a vertically disposed elongated member.

6. The cover of claim 5 wherein said vertical member is pivotally attached at its upper end to said horizontal member.

7. The cover of claim 5 wherein the lower end of said vertical member rests on said rear compartment floor.

8. The cover of claim 1 further including a lock means to secure said side panels and said rear wall in said closed position.

* * * * *